(12) United States Patent
Tangudu et al.

(10) Patent No.: US 12,294,246 B2
(45) Date of Patent: May 6, 2025

(54) AIRCRAFT ELECTRIC MOTOR

(71) Applicant: Hamilton Sundstrand Corporation, Charlotte, NC (US)

(72) Inventors: Jagadeesh K. Tangudu, South Windsor, CT (US); Joseph K. Coldwate, Roscoe, IL (US); Zhentao Stephen Du, Rocky Hill, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 282 days.

(21) Appl. No.: 17/739,495

(22) Filed: May 9, 2022

(65) Prior Publication Data
US 2023/0361638 A1 Nov. 9, 2023

(51) Int. Cl.
*H02K 1/2795* (2022.01)
*B64D 27/24* (2024.01)
*H02K 1/16* (2006.01)
*H02K 7/00* (2006.01)

(52) U.S. Cl.
CPC .......... *H02K 1/2795* (2022.01); *B64D 27/24* (2013.01); *H02K 1/16* (2013.01); *H02K 7/003* (2013.01)

(58) Field of Classification Search
CPC ........ H02K 1/2795; H02K 1/16; H02K 7/003; H02K 9/19; H02K 1/20; H02K 21/22; B64D 27/24
USPC ............. 310/54, 216.091, 216.092, 216.093, 310/216.094, 216.12, 216.095, 216.096
See application file for complete search history.

(56) References Cited

U.S. PATENT DOCUMENTS

| | | | |
|---|---|---|---|
| 7,019,433 B2 | 3/2006 | Hashimoto et al. | |
| 8,847,460 B2* | 9/2014 | Jurkovic | H02K 29/03 310/216.096 |
| 10,938,259 B2 | 3/2021 | Krizan et al. | |
| 2005/0258700 A1* | 11/2005 | Fratta | H02K 29/03 310/156.53 |

(Continued)

FOREIGN PATENT DOCUMENTS

| | | |
|---|---|---|
| CN | 110635583 A * | 12/2019 |
| CN | 110635583 B | 10/2020 |
| DE | 102017110841 A1 | 11/2018 |

OTHER PUBLICATIONS

Machine Translation for CN-110635583-A (Year: 2019).*
European Search Report for European Application No. 23172363.6; Date of Action: Oct. 16, 2023; 7 pages.

*Primary Examiner* — Quyen P Leung
*Assistant Examiner* — Charlie Frank Mann, Jr.
(74) *Attorney, Agent, or Firm* — CANTOR COLBURN LLP

(57) ABSTRACT

Aircraft electric motors include a rotor having magnet segments arranged on a frame of the rotor, the rotor defining an internal cavity radially inward from the magnet segments. An output shaft is operably coupled to the rotor and a stator, having a yoke and at least one winding wrapped about stator teeth, is arranged within the internal cavity of the rotor. The stator defines a radial span as a distance from the yoke to a radial outward edge of the at least one winding. The plurality of stator teeth have at least one tooth formed from a magnetic material with the tooth having an engagement end configured to engaged with the yoke, a distal end opposite the engagement end, and a shaped end at the distal end of the tooth, with a portion of the tooth at the shaped end being closer to the yoke than the radial span.

20 Claims, 16 Drawing Sheets

(56) References Cited

U.S. PATENT DOCUMENTS

| | | | |
|---|---|---|---|
| 2013/0169097 A1* | 7/2013 | Saban | H02K 21/22 |
| | | | 310/152 |
| 2015/0022044 A1 | 1/2015 | Chowdhury et al. | |
| 2020/0161953 A1 | 5/2020 | Chowdhury et al. | |
| 2021/0351668 A1* | 11/2021 | Leiber | H02K 9/223 |

* cited by examiner

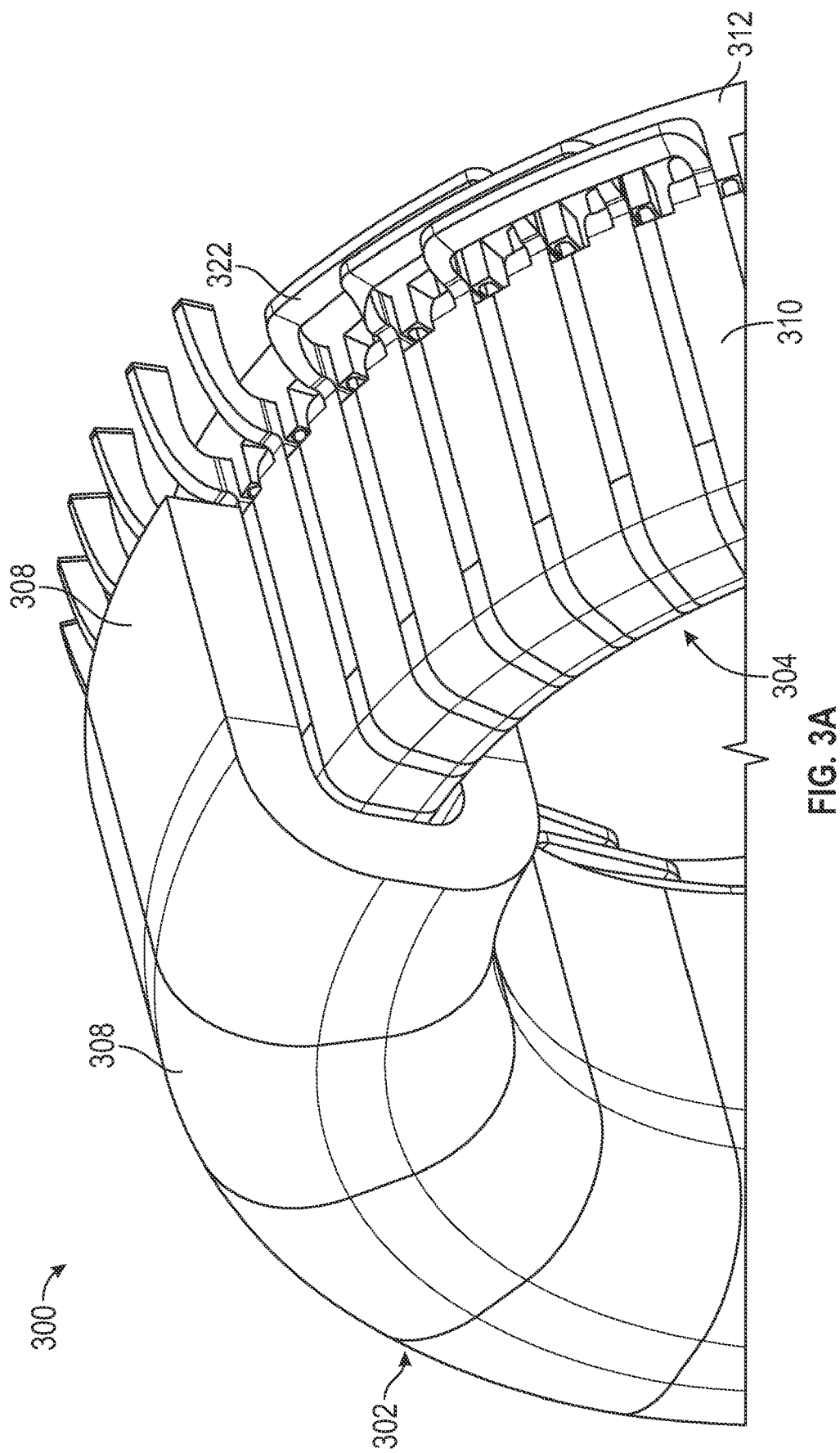

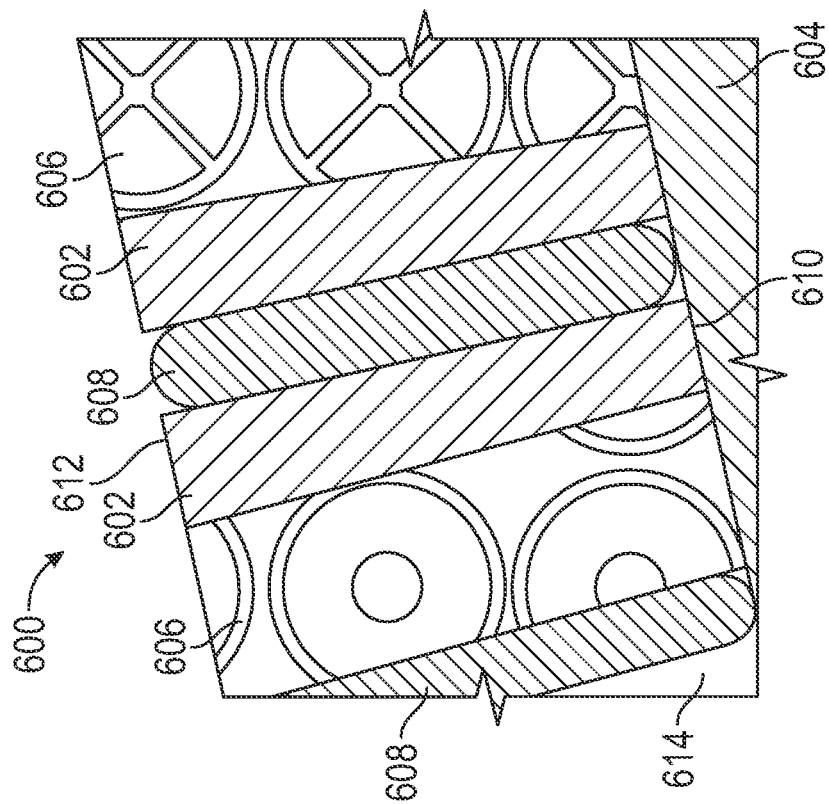
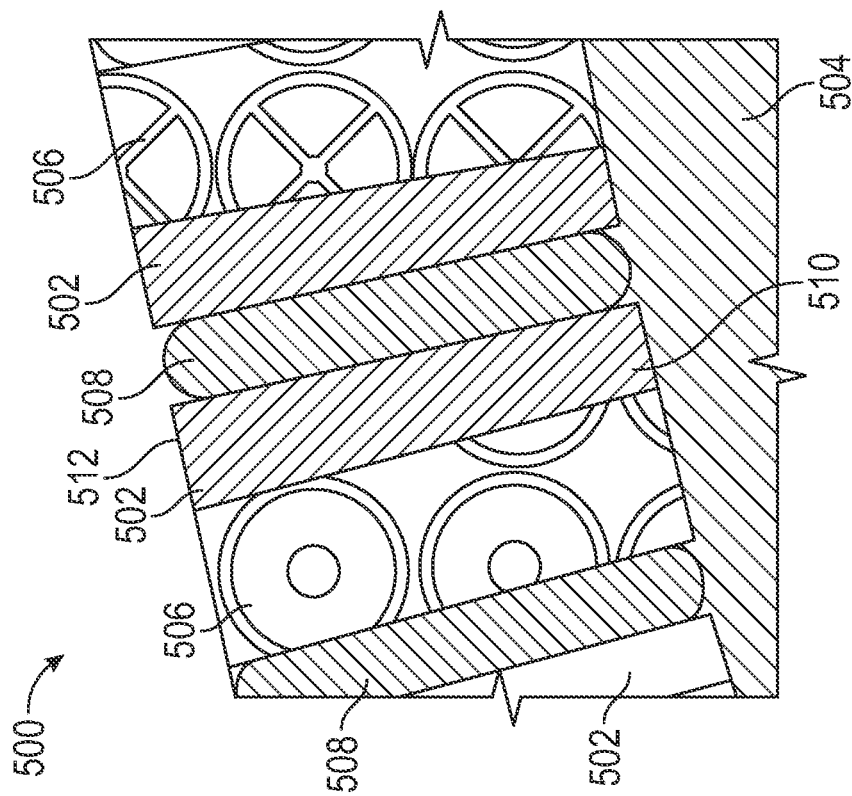

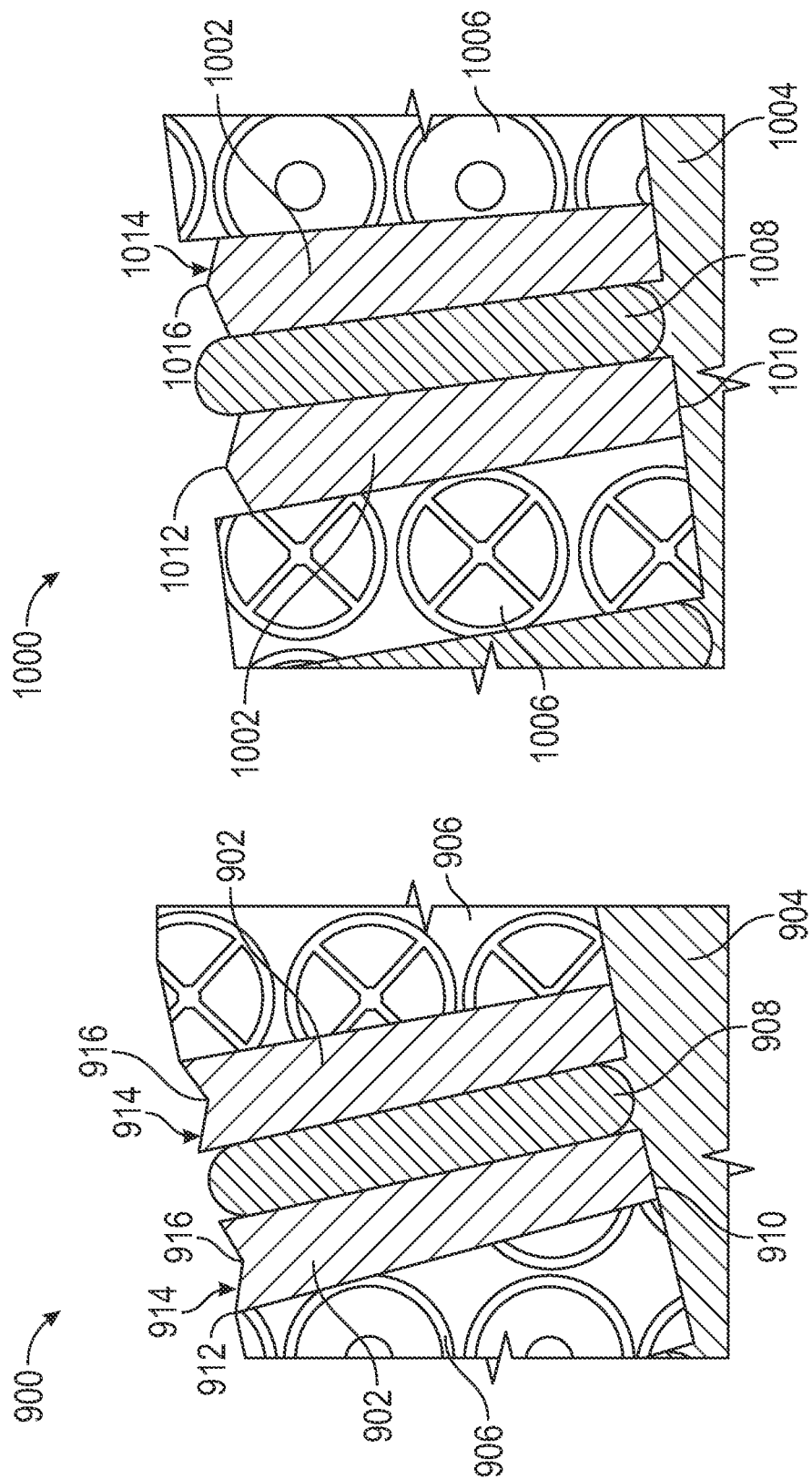

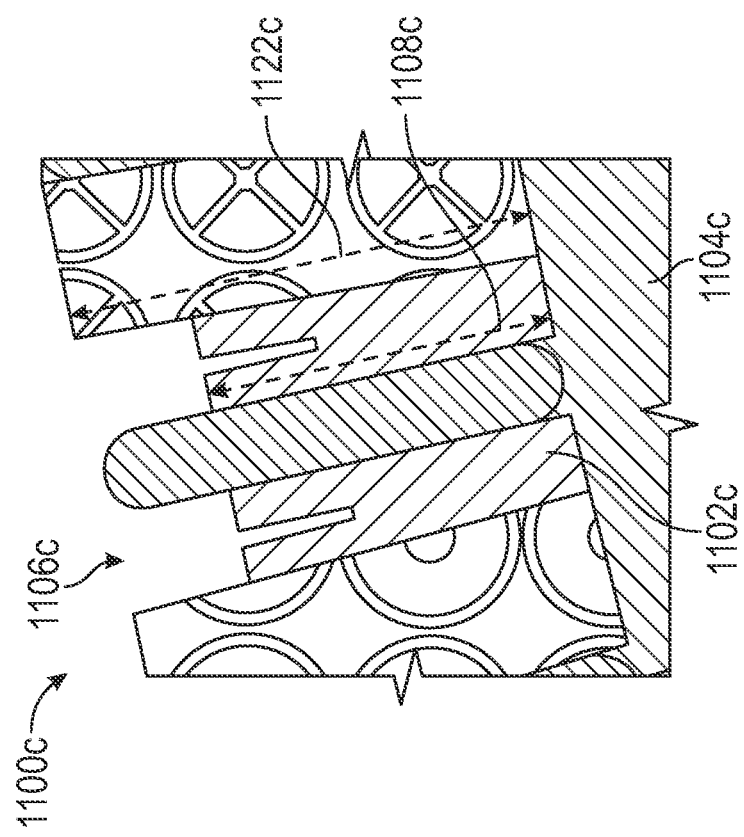
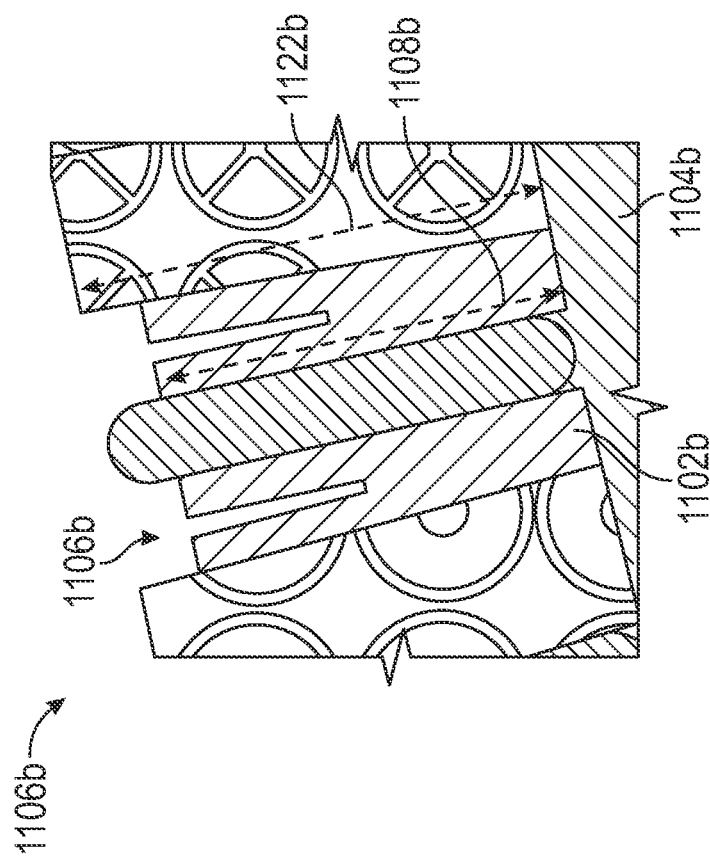

AIRCRAFT ELECTRIC MOTOR

STATEMENT OF FEDERAL SUPPORT

This invention was made with Government support under contract number DE-AR0001351, awarded by the Department of Energy. The Government has certain rights in the invention.

BACKGROUND

The present disclosure relates to electric motors, and more particularly, to electric motor assemblies with high efficiency and power density having relatively low weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a rotor having a plurality of magnet segments arranged on a frame of the rotor, the rotor defining an internal cavity radially inward from the plurality of magnet segments, an output shaft operably coupled to the rotor, and a stator having a yoke and at least one winding wrapped about a plurality of stator teeth, the stator arranged within the internal cavity of the rotor, wherein the stator defines a radial span as a distance from the yoke to a radial outward edge of the at least one winding. The plurality of stator teeth include at least one tooth formed from a magnetic material. The tooth has an engagement end configured to engaged with the yoke, a distal end opposite the engagement end, and a shaped end at the distal end of the tooth, wherein a portion of the tooth at the shaped end is closer to the yoke than the radial span.

In addition to one or more of the features described herein, or as an alternative, further embodiments of the aircraft electric motors may include a cooling channel, wherein a first tooth is arranged on a first side of the cooling channel and a second tooth is arranged on a second side of the cooling channel opposite the first tooth and a winding is wrapped about a side of the first and second teeth opposite the cooling channel.

In addition to one or more of the features described herein, or as an alternative, further embodiments of the aircraft electric motors may include that the shaped end defines a tapered surface extending in a direction toward the yoke and tapering from the cooling channel toward the winding.

In addition to one or more of the features described herein, or as an alternative, further embodiments of the aircraft electric motors may include that the shaped end defines a tapered surface extending in a direction toward the yoke and tapering from the winding toward the cooling channel.

In addition to one or more of the features described herein, or as an alternative, further embodiments of the aircraft electric motors may include that the shaped end defines a tapered surface extending in a direction toward the yoke and tapering both from the cooling channel and the winding and tapering toward an inflection point.

In addition to one or more of the features described herein, or as an alternative, further embodiments of the aircraft electric motors may include that the inflection point is equidistant from the winding and the cooling channel.

In addition to one or more of the features described herein, or as an alternative, further embodiments of the aircraft electric motors may include that the shaped end defines a tapered surface extending in a direction toward the yoke and tapering toward both the cooling channel and the winding and tapering from an inflection point.

In addition to one or more of the features described herein, or as an alternative, further embodiments of the aircraft electric motors may include that the inflection point is equidistant from the winding and the cooling channel.

In addition to one or more of the features described herein, or as an alternative, further embodiments of the aircraft electric motors may include that the shaped end comprises a radial slot extending from the distal end toward the yoke.

In addition to one or more of the features described herein, or as an alternative, further embodiments of the aircraft electric motors may include that the radial slot is defined between two radial arms of the at least one tooth.

In addition to one or more of the features described herein, or as an alternative, further embodiments of the aircraft electric motors may include that the two radial arms extend radially to the radial span of the stator.

In addition to one or more of the features described herein, or as an alternative, further embodiments of the aircraft electric motors may include that the two radial arms extend radially to a position less than the radial span of the stator.

In addition to one or more of the features described herein, or as an alternative, further embodiments of the aircraft electric motors may include that the two radial arms extend radially to a position between 50% and 100% of the radial span.

In addition to one or more of the features described herein, or as an alternative, further embodiments of the aircraft electric motors may include that the radial slot ends at a point about 50% between the yoke and the radial span.

In addition to one or more of the features described herein, or as an alternative, further embodiments of the aircraft electric motors may include that the at least one tooth is integrally formed with the yoke.

In addition to one or more of the features described herein, or as an alternative, further embodiments of the aircraft electric motors may include that the at least one tooth is mechanically coupled to the yoke by a mechanical coupling.

In addition to one or more of the features described herein, or as an alternative, further embodiments of the aircraft electric motors may include that the mechanical coupling is a dovetail configuration.

In addition to one or more of the features described herein, or as an alternative, further embodiments of the aircraft electric motors may include that each tooth of the plurality of teeth comprises a shaped end.

In addition to one or more of the features described herein, or as an alternative, further embodiments of the aircraft electric motors may include that the plurality of teeth comprise a pattern of different shaped ends about a circumference of the stator.

In addition to one or more of the features described herein, or as an alternative, further embodiments of the aircraft electric motors may include that the at least one tooth is arranged as an outer tooth of the stator.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3A is a schematic illustration of a rotor and stator of an aircraft electric motor in accordance with an embodiment of the present disclosure;

FIG. 5 is a schematic illustration of a portion of a stator of aircraft electric motor in accordance with an embodiment of the present disclosure;

FIG. 6 is a schematic illustration of a portion of a stator of aircraft electric motor in accordance with an embodiment of the present disclosure;

FIG. 9 is a schematic illustration of a portion of a stator of aircraft electric motor in accordance with an embodiment of the present disclosure;

FIG. 10 is a schematic illustration of a portion of a stator of aircraft electric motor in accordance with an embodiment of the present disclosure;

FIG. 11B is a schematic illustration of a portion of a stator of aircraft electric motor in accordance with an embodiment of the present disclosure;

FIG. 11C is a schematic illustration of a portion of a stator of aircraft electric motor in accordance with an embodiment of the present disclosure;

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
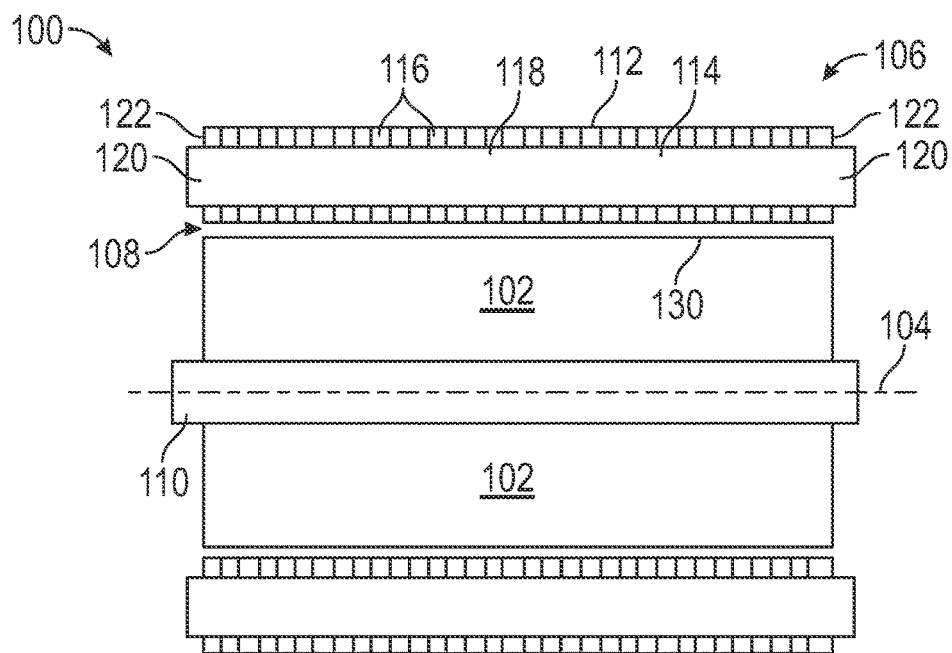
FIG. 1A is a partial view of an embodiment of electric motor.
Figure 1B:
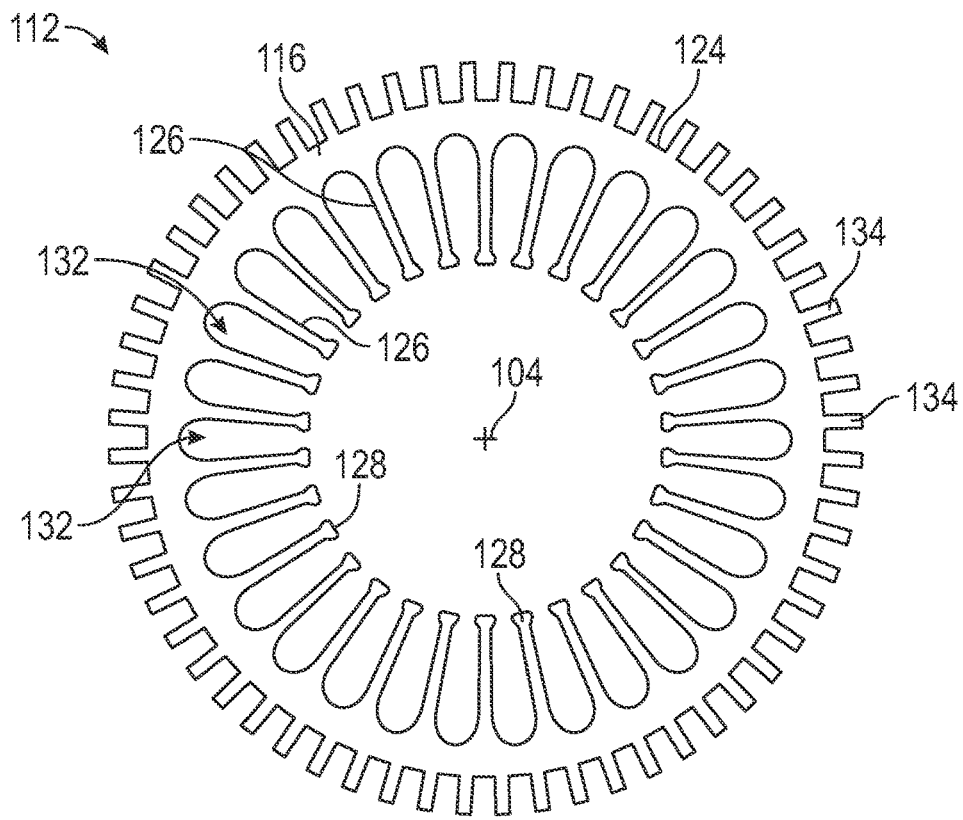
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
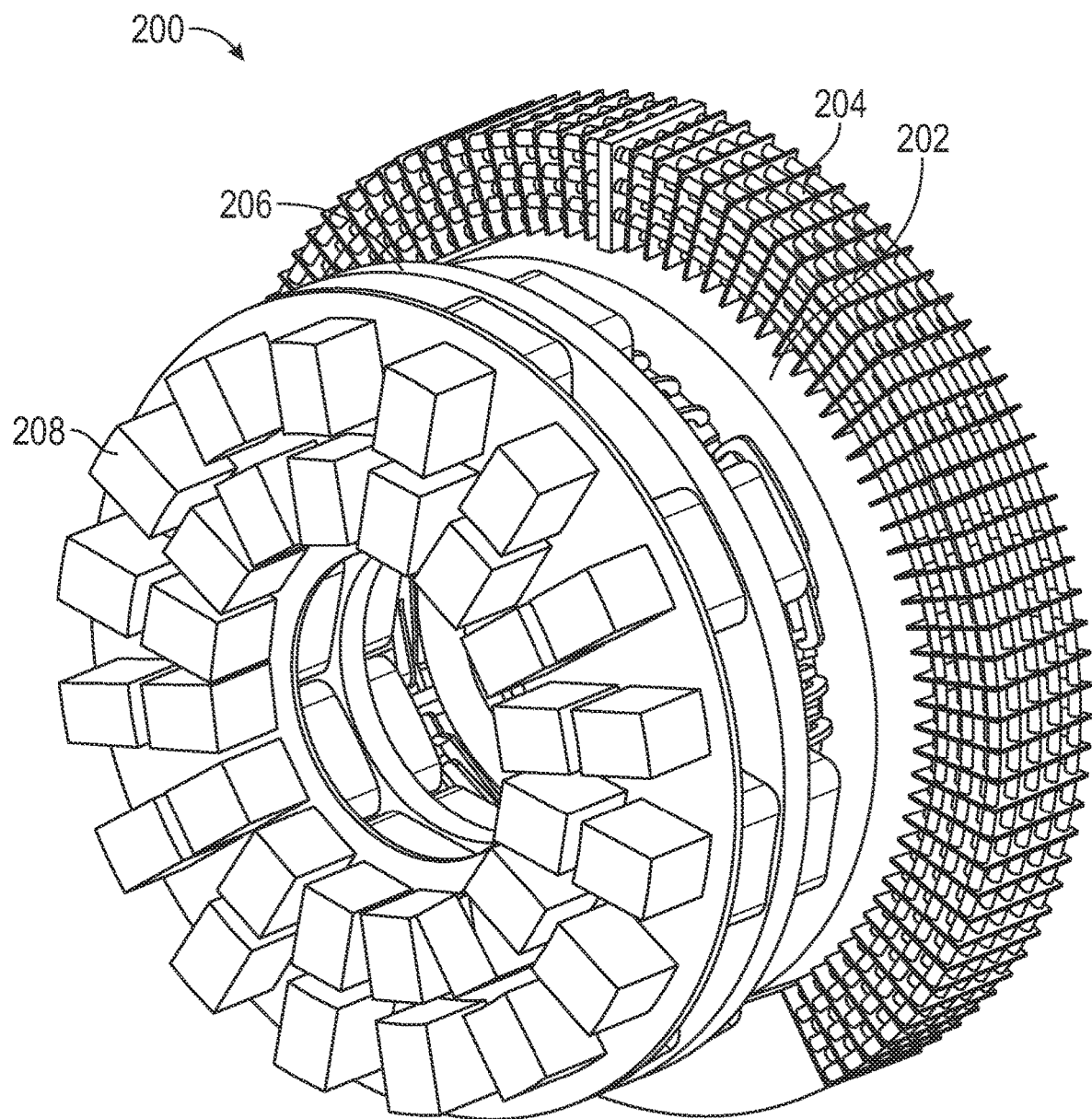
FIG. 2A is a schematic illustration of an aircraft electric motor in accordance with an embodiment of the present disclosure.
Figure 2B:
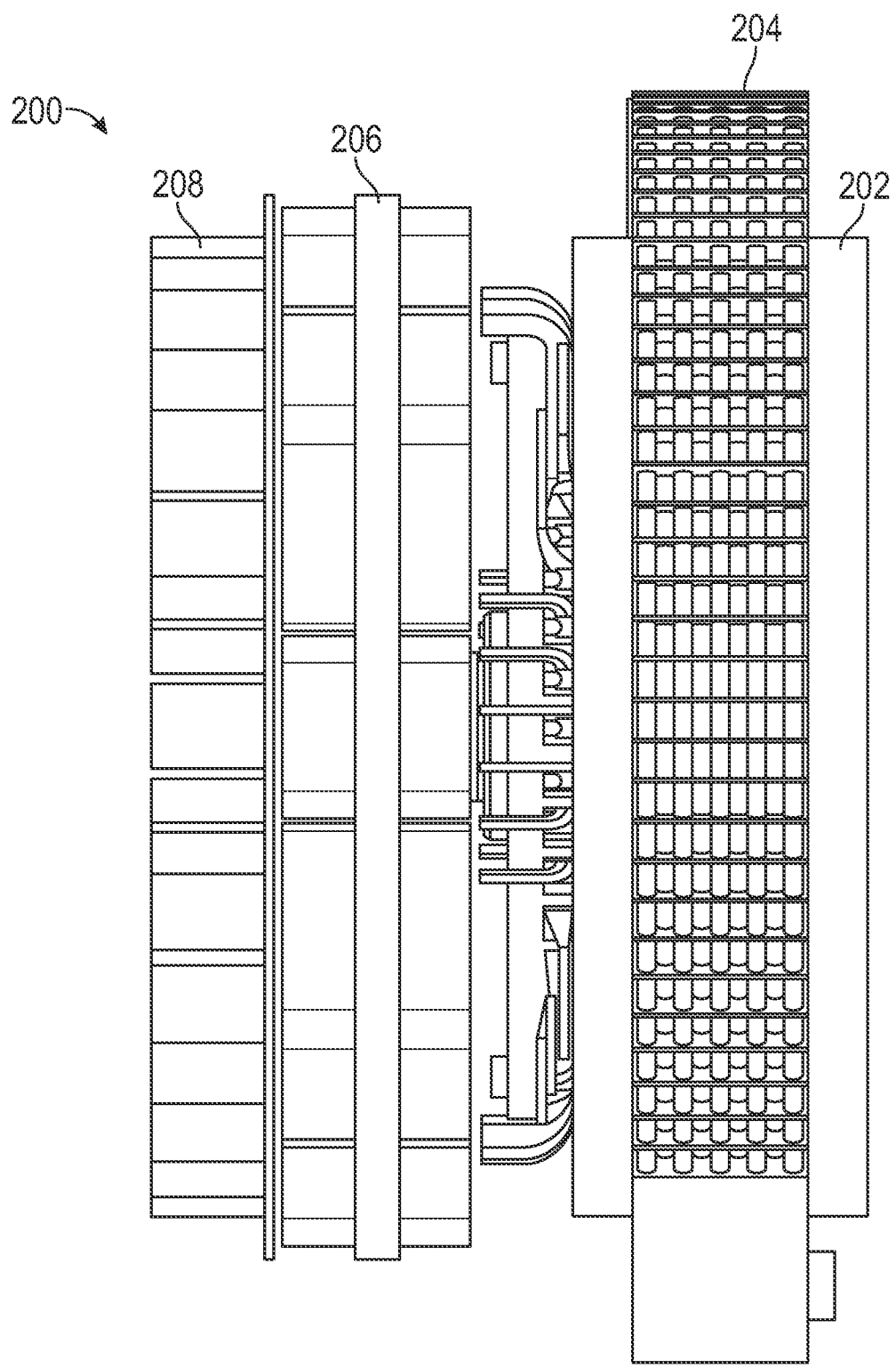
FIG. 2B is a side elevation view of the aircraft electric motor of FIG. 2A.
Figure 2C:
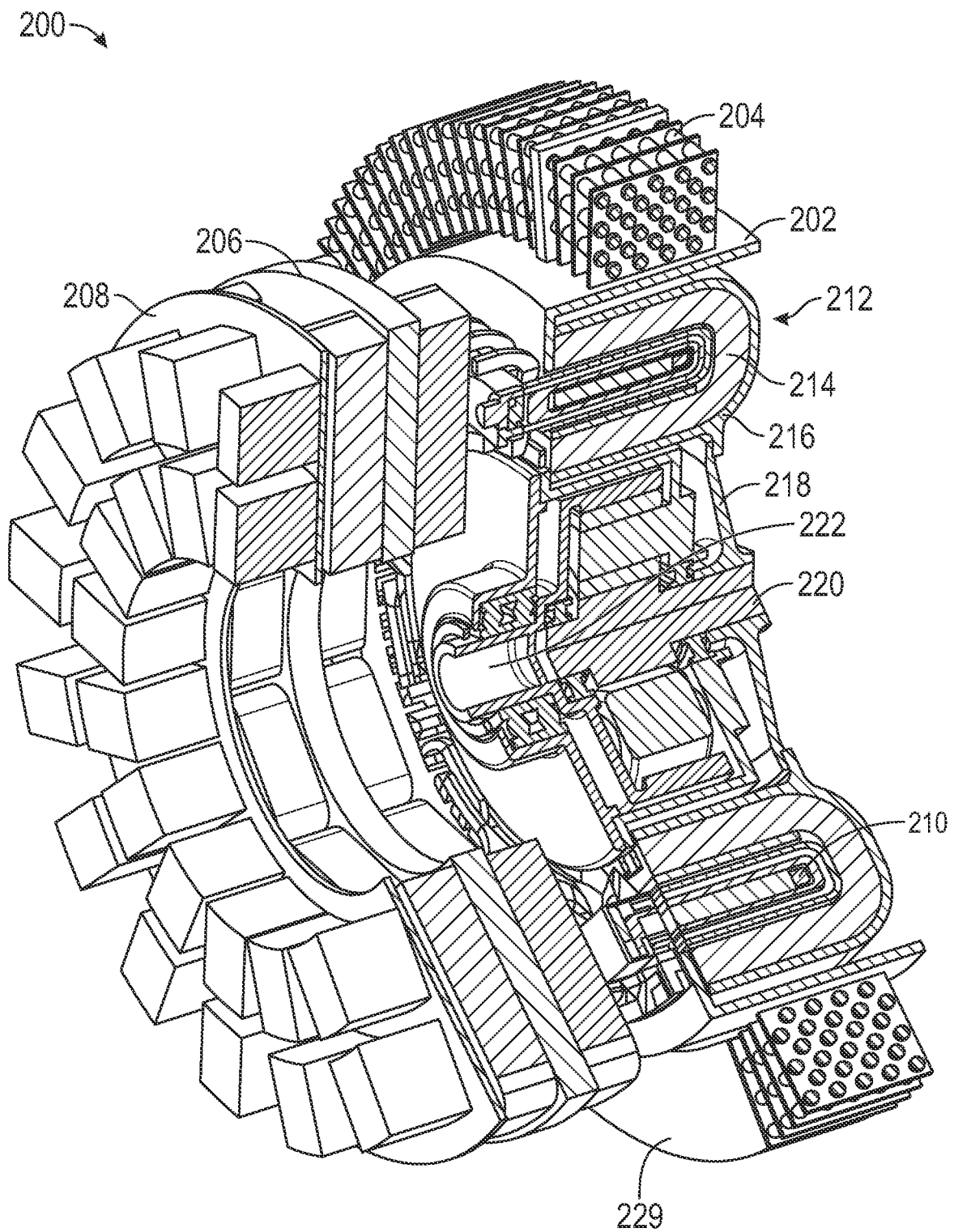
FIG. 2C is a partial cut-away illustration of the aircraft electric motor of FIG. 2A.
Figure 2D:
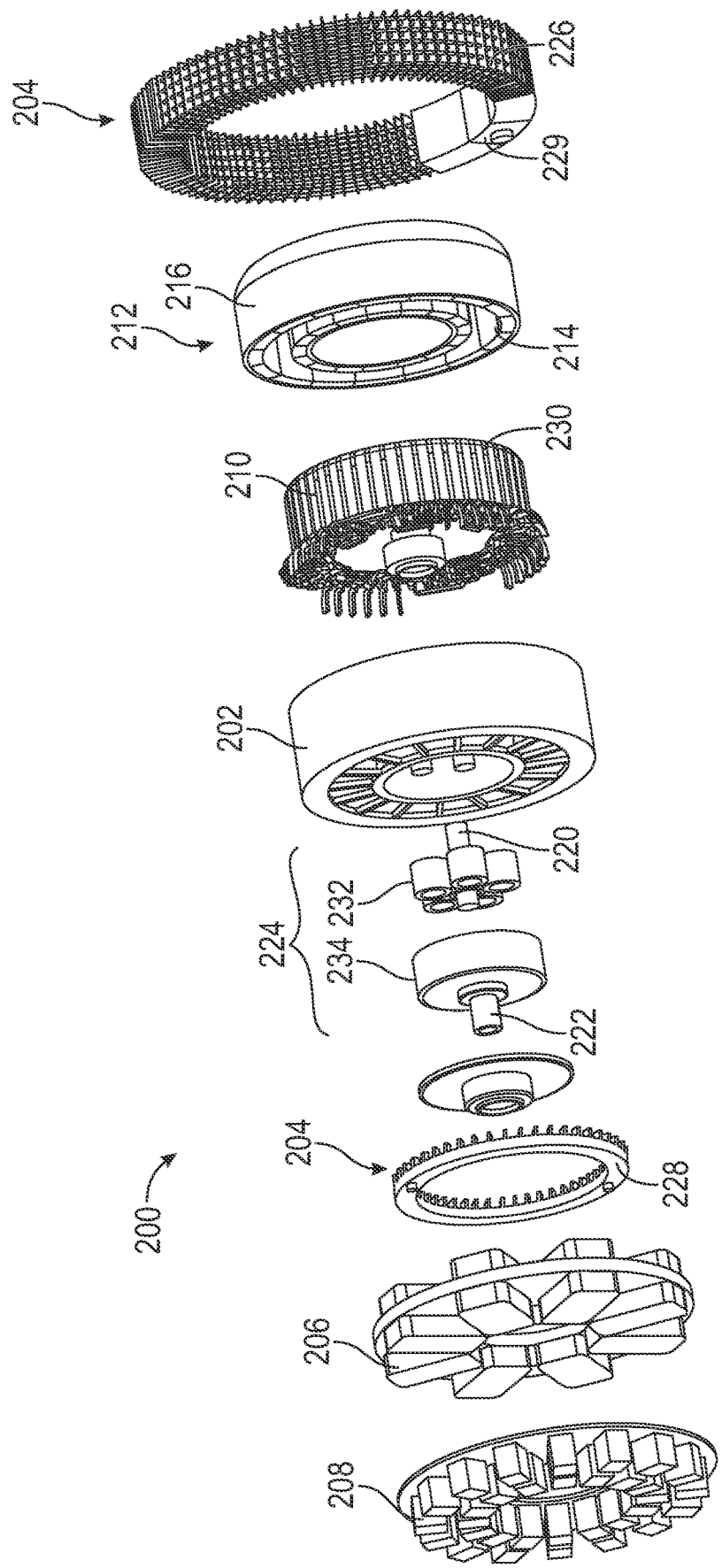
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular or annular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that are configured to control and operate the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3B:
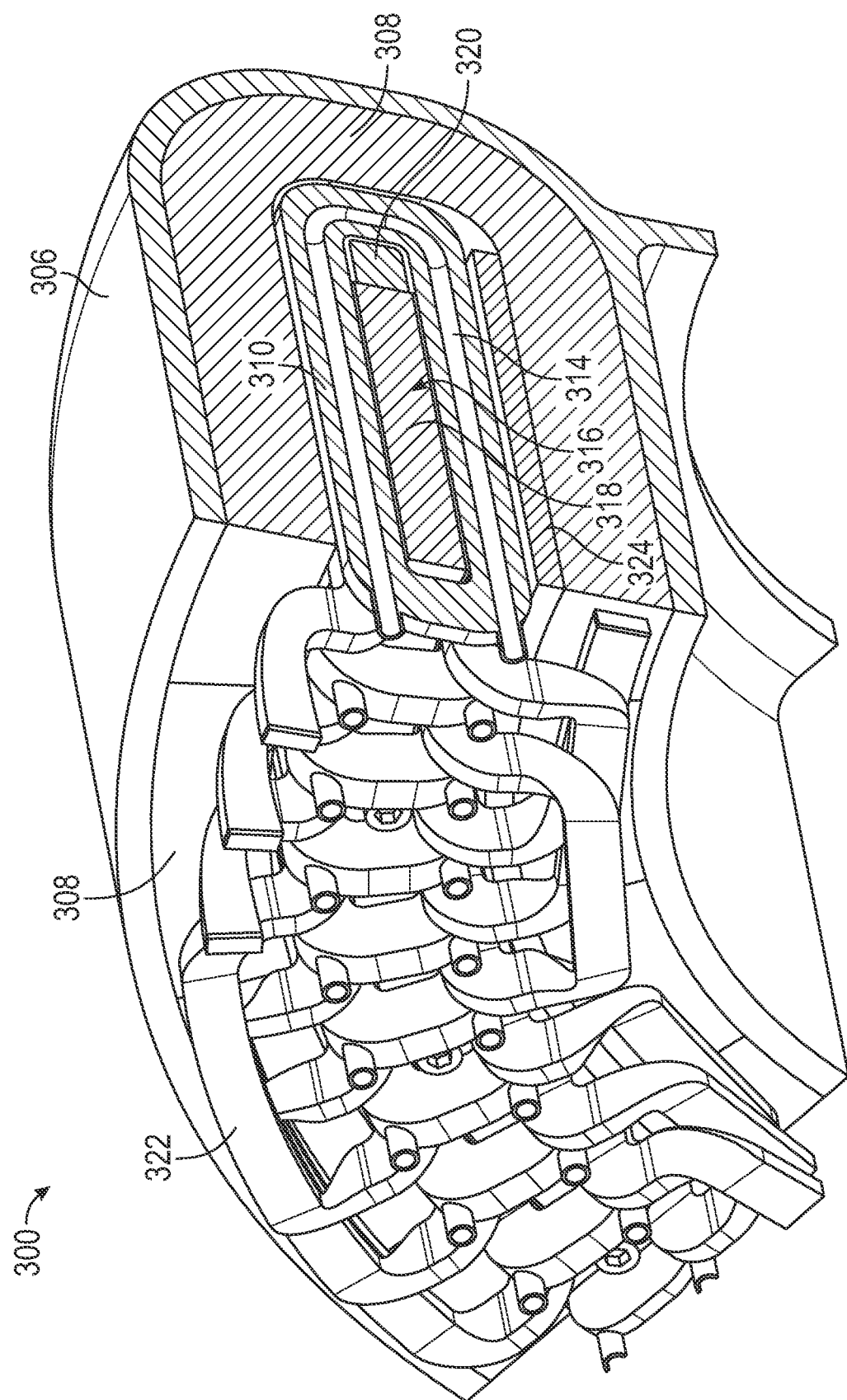
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 310 include end connections 322 and may be electrically connected to one or more power module systems of the aircraft electric motor, such as shown above.

As shown in FIG. 3B, the magnets 308 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact allows for free rotation of the rotor 302 relative to the stator 304 during operation.

In aviation-class electric motors, such as shown and described above, a high-power density can be achieved by maximizing torque at a given speed. The torque density can be increased by improving utilization of magnetic materials and increase magnetic loading. Prior concepts for maximizing power density was achieved through minimizing the core of the rotor system. However, such minimization has an impact on magnetic loading (average airgap flux density). Conventionally, introducing a magnetic tooth can increase magnetic loading but may also increase torque ripple. Torque ripple is an effect seen in electric motor designs and refers to a periodic increase or decrease in output torque as the motor shaft rotates. Accordingly, it is desirable to both maximize magnetic loading while minimizing torque ripple. In view of this, embodiments of the present disclosure are directed to incorporating magnetic teeth within the motor assembly where both magnetic loading is increased while torque ripple is decreased. In accordance with embodiments of the present disclosure, shaped, magnetic teeth are provided the are configured to increase magnetic loading while minimizing torque ripple.

Figure 4A:
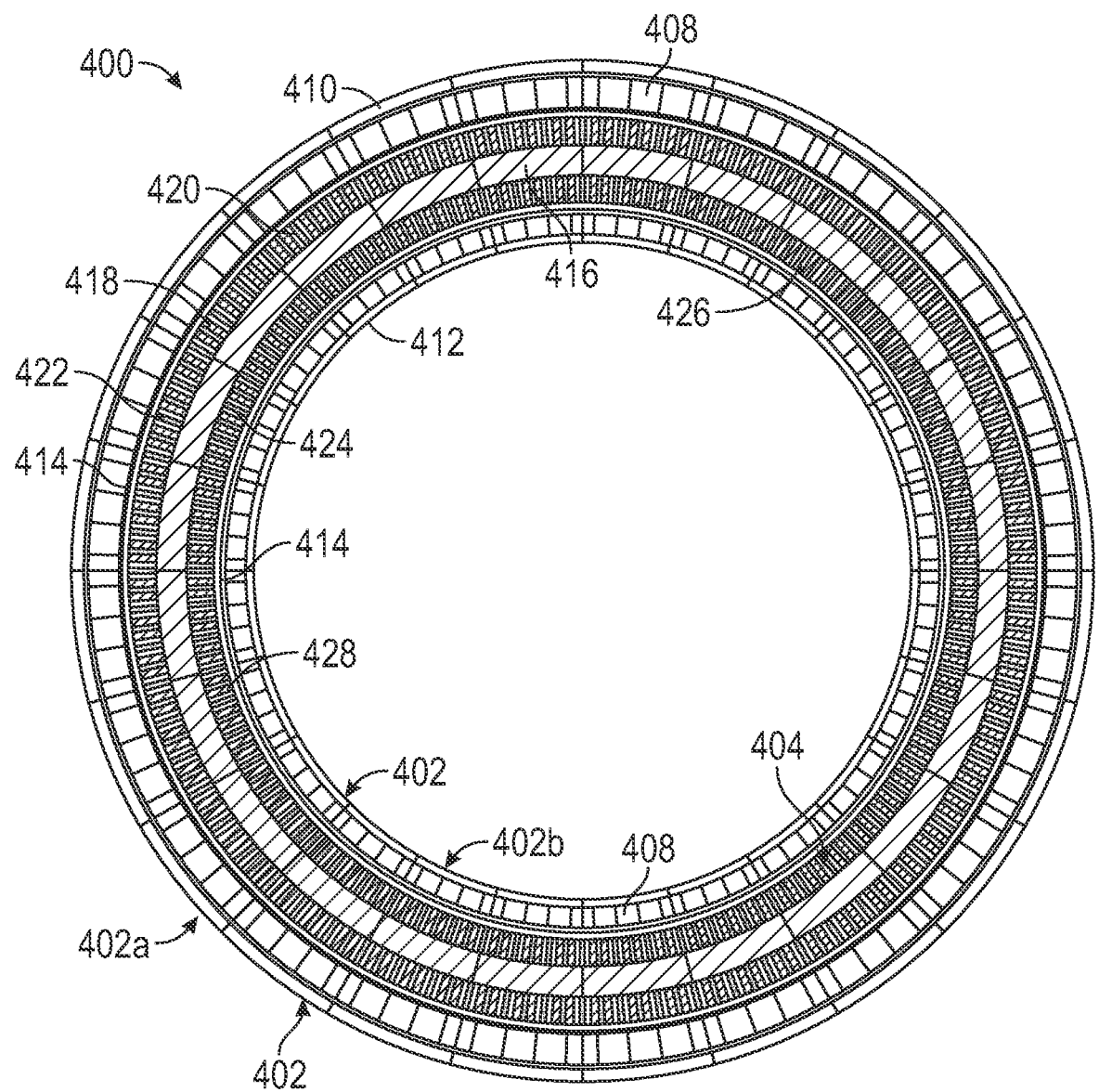
FIG. 4A is a schematic illustration of a radial cross-section of an aircraft electric motor in accordance with an embodiment of the present disclosure.
Figure 4B:
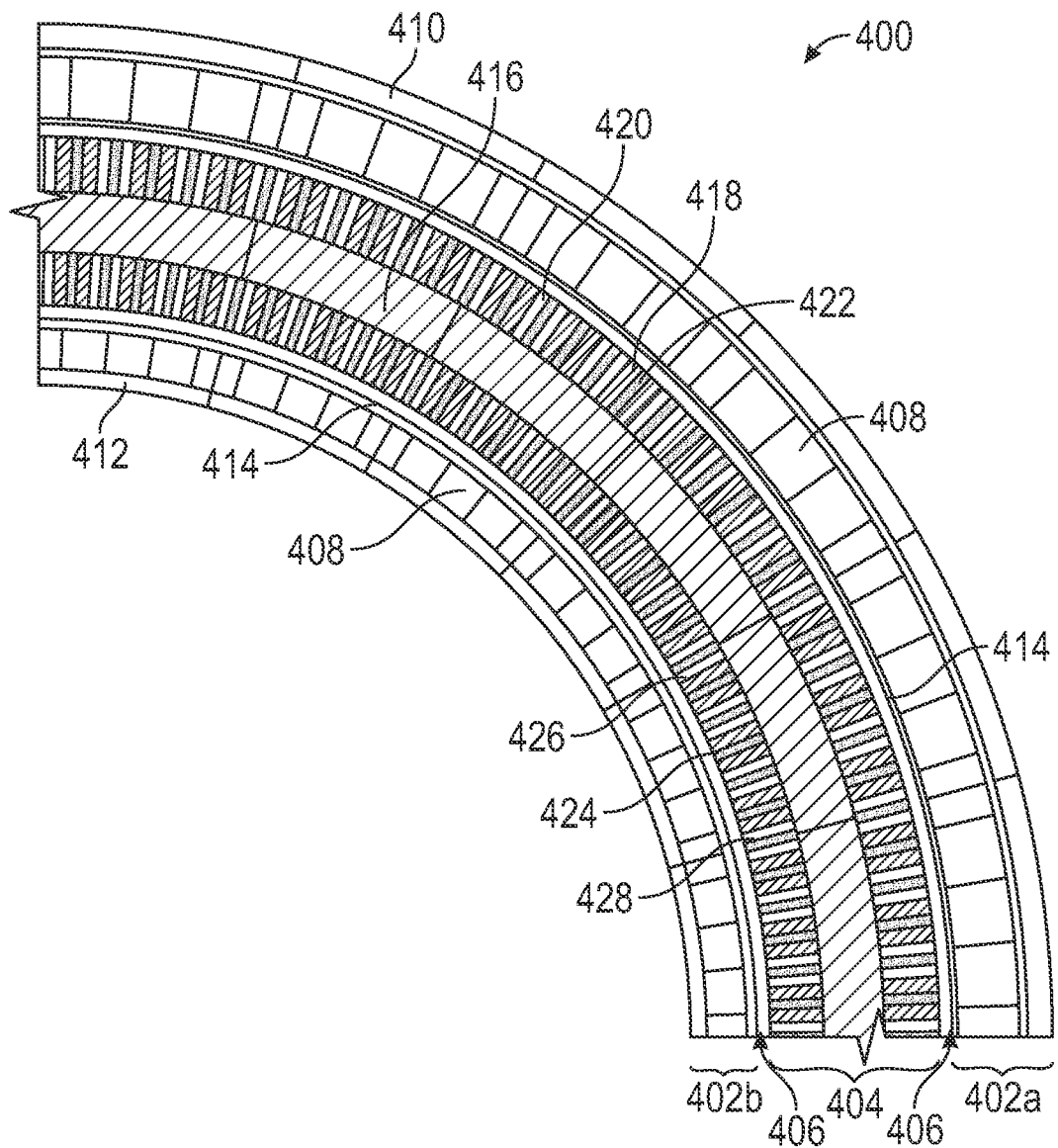
FIG. 4B is an enlarged illustration of a portion of the structure shown in FIG. 4A.

Referring to FIGS. 4A-4B, schematic illustrations of a portion of an aircraft electric motor 400 in accordance with an embodiment of the present disclosure is shown. FIGS. 4A-4B illustrate a portion of a rotor 402 and a stator 404 of the aircraft electric motor 400. FIG. 4A illustrates the full circular structure of the rotor 402 and the stator 404 and FIG. 4B illustrates an enlarged illustration of a portion of the rotor 402 and the stator 404. The rotor 402 and the stator 404 may be part of an aircraft electric motor similar to that shown and described above and used as described herein.

As shown, the rotor 402 is arranged about the stator 404, with an outer portion 402a and an inner portion 402b arranged radially outward and inward from the stator 404, respectively. The outer and inner portions 402a, 402b may be parts of a substantially U-shaped magnet assembly, as shown and described above. The stator 404 is arranged between the outer and inner portions 402a, 402b with an air gap 406 therebetween, as shown in FIG. 4B. The rotor 404 includes a plurality of magnets 408, which may be substantially U-shaped and span from the outer portion 402a to the inner portion 402b. An outer rotor sleeve 410 and an inner rotor sleeve 412 may be separate components or a continuous structure, as shown and described above, and are configured to support and retain the magnets 408 of the rotor 402. Further, one or more retention sleeves 414 may be arranged on a side of the magnets 408 that faces the stator 404. The rotor 402 is configured to be rotationally driven by current that is passed through the stator 404.

The stator 404 includes a back iron or yoke 416. The yoke 416 supports, on a radial outer side thereof, a plurality of outer teeth 418, outer coils 420, and outer cooling channels 422. Similarly, on a radially inner side of the yoke 416 are arranged a plurality of inner teeth 424, inner coils 426, and inner cooling channels 428.

In some embodiments of the present disclosure, one or more of the outer teeth 418 and/or the inner teeth 424 may be made of a magnetic material. Further, such teeth may be shaped or configured with one or more structural features designed to improve magnetic loading and reduce torque ripple. In some example embodiments, the outer teeth 418 may be formed of a magnetic material and shaped to reduce torque ripple while increasing magnetic loading and improving manufacturability and address stack-up tolerance challenges.

As shown in FIG. 4A, the rotor 402 and stator 404 form a substantially ring-shape or annular shape. As shown, the outer teeth 418 and the inner teeth 424 are each arranged in a circumferential arrangement and extend radially from the yoke 416. The outer teeth 418 extend radially outward from the yoke 416 and the inner teeth 424 extend radially inward from the yoke 416. In some configurations, the teeth 418, 424 may be the same in shape, orientation, material, and the like about the circumferences of the stator 404. In other embodiments, the teeth 418, 424 may be arranged in sets or specific configurations arranged in a repeating pattern about the respective circumferential arrangement.

Referring now to FIG. 5, a schematic illustration of a portion of a stator 500, in accordance with an embodiment of the present disclosure, having teeth 502 is shown. In this illustration, the teeth 502 are mounted to or otherwise attached to a yoke 504. In some embodiments, the teeth 502 may be formed of the same material as the yoke 504. As shown, the teeth 502 extend radially outward from the yoke 504, and thus are representative of a set of outer teeth of the stator 500. The teeth 502 provide a support about which windings 506 may be wrapped. The stator 500 also includes one or more cooling channels 508 to provide cooling to the windings 506. In some embodiments, the teeth 502 may be integrally formed with the yoke 504. In still other embodiments, the yoke 504 and/or the teeth 502 may be formed as laminated structures, through sintering additive manufacturing, shaped from soft magnetic composites, and the like. The yoke 504 may be formed from iron and thus formed from a magnetic material. In contrast, the teeth 502 may be formed from a non-magnetic material, in an effort to reduce torque ripple, as magnetic teeth may induce increased torque ripple in electric motors. As shown, in this embodiment, each tooth 502 has an engagement end 510 for engaging with the yoke 504 (e.g., by brazing, welding, adhesive, integral material connection, etc.) and a distal end 512 at an end of the teeth 502 away from the yoke 504. The teeth 502 may have a tapering structure in a circumferential thickness from the distal end 512 toward the engagement end 510 such that the tooth 502 narrows its thickness from the distal end 512 toward the engagement end 510.

Referring now to FIG. 6, a schematic illustration of a portion of a stator 600, in accordance with an embodiment of the present disclosure, having teeth 602 is shown. In this illustration, the teeth 602 are mounted to or otherwise attached to a yoke 604. The teeth 602 provide a support about which windings 606 may be wrapped and one or more cooling channels 608 are arranged to provide cooling to the windings 606. Each tooth 602 has an engagement end 610 for engaging with the yoke 604 (e.g., by brazing, welding, adhesive, integral material connection, etc.) and a distal end 612 at an end of the teeth 602 away from the yoke 604. The teeth 602 may have a tapering structure in a circumferential thickness from the distal end 612 toward the engagement end 610. In this embodiment, the teeth 602 are formed of a magnetic material. Such magnetic material may increase a magnetic loading of a motor in which the magnetic teeth 602 are incorporated. However, as noted above, torque ripple may be increased by such a configuration. In some embodiments, to alleviate such torque ripple while still increasing magnetic loading, the magnetic teeth 602 may be arranged in an alternating pattern with non-magnetic teeth 614.

Figure 7:
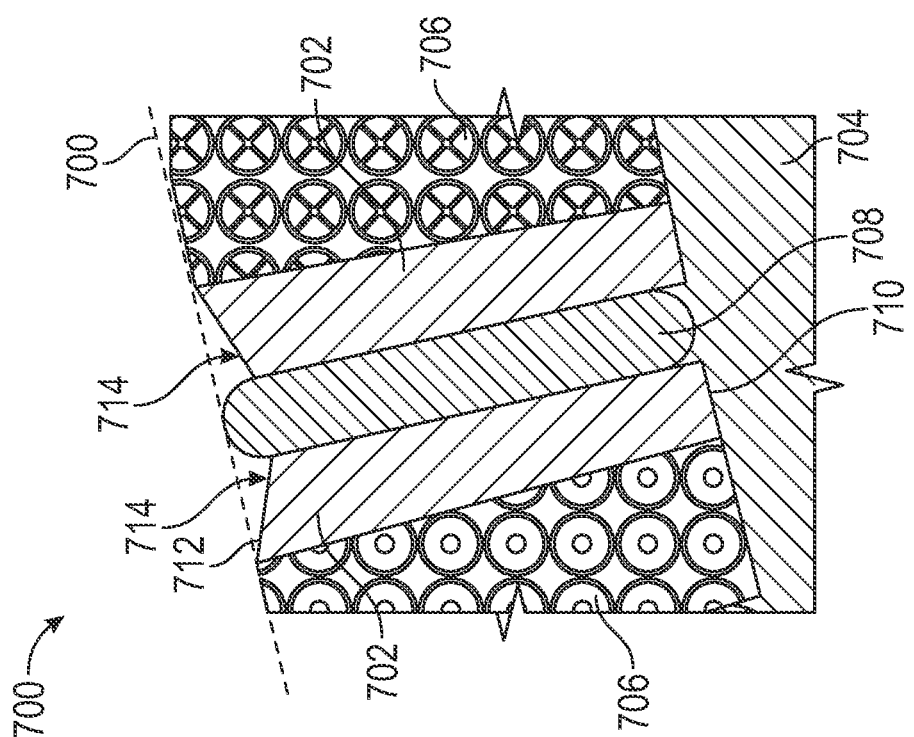
FIG. 7 is a schematic illustration of a portion of a stator of aircraft electric motor in accordance with an embodiment of the present disclosure.

Referring now to FIG. 7, a schematic illustration of a portion of a stator 700, in accordance with an embodiment of the present disclosure, having teeth 702 is shown. In this illustration, the teeth 702 are mounted to or otherwise attached to a yoke 704. The teeth 702 provide a support about which windings 706 may be wrapped and one or more cooling channels 708 are arranged to provide cooling to the windings 706. Each tooth 702 has an engagement end 710 for engaging with the yoke 704 (e.g., by brazing, welding, adhesive, integral material connection, etc.) and a distal end 712 at an end of the teeth 702 away from the yoke 704. Similar to the embodiment of FIG. 6, the teeth 702 may have a tapering structure in a circumferential thickness from the distal end 712 toward the engagement end 710 and are formed of a magnetic material.

As shown in FIG. 7, and in the other embodiments shown and described herein, a pair of teeth 702 are arranged with a cooling channel 708 arranged therebetween. On opposite sides of each tooth 702 from the shared cooling channel 708 are the windings 706. In this embodiment, the distal end 712 of the teeth 702 includes a shaped end 714. The shaped end 714, in this embodiment, is formed by a reduction in material of the tooth 702 as compared to a conventional tooth (e.g., shown in FIGS. 5-6) and includes a tapering surface that tapers radially inward toward the yoke 704. The shaped end 714, in this configuration, also includes a tapering in the circumferential direction that tapers radially inward from the windings 706 toward the cooling channel 708. The shaped end 714 of embodiments of the present disclosure has a reduction in material (or no material present) inward from an outer circumference 716 of the stator 700. This radially inward tapering of the shaped end 714 ensures that the teeth 702 do not extend outward radially such that they reduce a gap between the stator 700 and an associated rotor.

Figure 8:
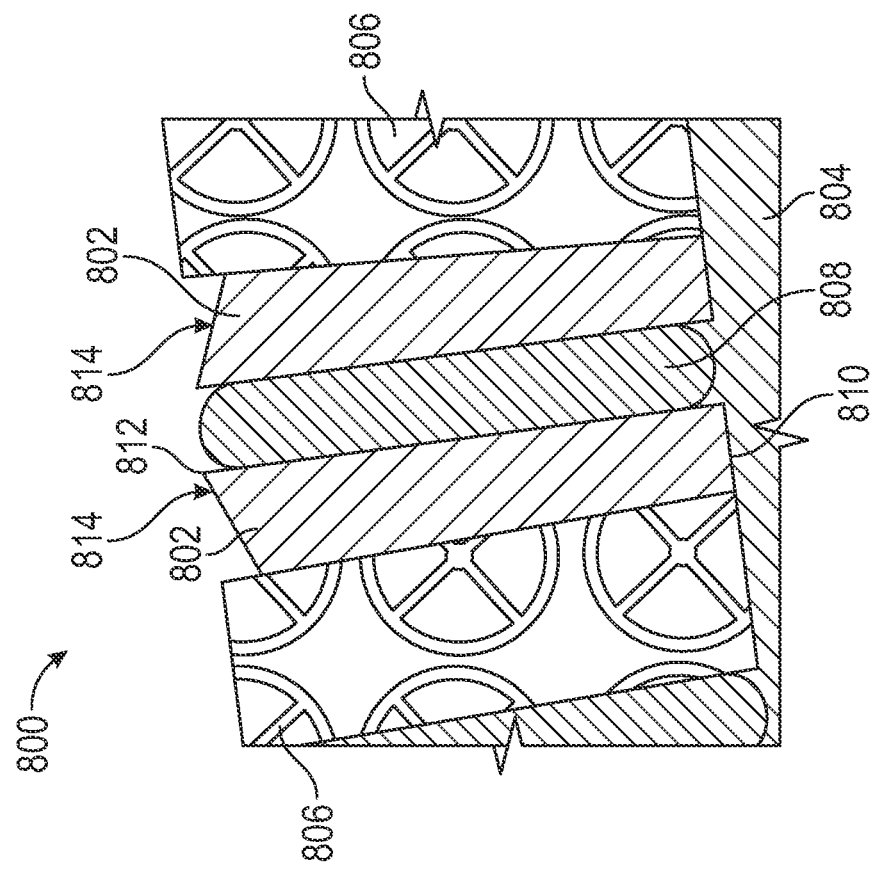
FIG. 8 is a schematic illustration of a portion of a stator of aircraft electric motor in accordance with an embodiment of the present disclosure.

Referring now to FIG. 8, a schematic illustration of a portion of a stator 800, in accordance with an embodiment of the present disclosure, having teeth 802 is shown. In this illustration, the teeth 802 are mounted to or otherwise attached to a yoke 804. The teeth 802 provide a support about which windings 806 may be wrapped and one or more cooling channels 808 are arranged to provide cooling to the windings 806. Each tooth 802 has an engagement end 810 for engaging with the yoke 804 and a distal end 812 at an end of the teeth 802 away from the yoke 804. The teeth 802 may have a tapering structure in a circumferential thickness from the distal end 812 toward the engagement end 810 and are formed of a magnetic material. The pair of teeth 802 illustrated in FIG. 8 are arranged with a cooling channel 808 arranged therebetween. On opposite sides of each tooth 802 from the shared cooling channel 808 are the windings 806. In this embodiment, the distal end 812 of the teeth 802 includes a shaped end 814. The shaped end 814, in this embodiment, tapers radially inward toward the yoke 804 and in the circumferential direction tapers radially inward from the cooling channel 808 toward the windings 806 (i.e., the opposite of that shown in FIG. 7). The shaped end 814 defines a reduction in material in the location of the teeth 802. This reduction in material and the geometric shape of the shaped end 814, in combination with a magnetic material for the teeth 802, allows for increased magnetic loading (e.g., through magnetic teeth) while reducing torque ripple (e.g., through shaped tooth).

Referring now to FIG. 9, a schematic illustration of a portion of a stator 900, in accordance with an embodiment of the present disclosure, having teeth 902 is shown. In this illustration, the teeth 902 are mounted to or otherwise attached to a yoke 904. The teeth 902 provide a support about which windings 906 may be wrapped and one or more cooling channels 908 are arranged to provide cooling to the windings 906. Each tooth 902 has an engagement end 910 for engaging with the yoke 904 and a distal end 912. The teeth 902 may have a tapering structure in a circumferential thickness from the distal end 912 toward the engagement end 910 and are formed of a magnetic material. The pair of teeth 902 illustrated in FIG. 9 are arranged with a cooling channel 908 arranged therebetween. On opposite sides of each tooth 902 from the shared cooling channel 908 are the windings 906. In this embodiment, the distal end 912 of the teeth 902 includes a shaped end 914. The shaped end 914, in this embodiment, tapers radially inward toward the yoke 904 and away from both the windings 906 and the cooling channel 908. The shaped end 914 defines a reduction in material in the location of the distal end 912 of the teeth 902. Because the shaped end 914 tapers inward from both sides, the shaped end 914 has a generally chevron or triangular shaping, with two tapered or inclined surfaces. In this embodiment, the shaped end 914 defines an inflection point 916. The inflection point 916, in some embodiments and as shown, may be a central point between opposing sides of the teeth 902 (i.e., substantially equidistant from the windings 906 on one side and the cooling channel 908 on the other side).

Referring now to FIG. 10, a schematic illustration of a portion of a stator 1000, in accordance with an embodiment of the present disclosure, having teeth 1002 is shown. In this illustration, the teeth 1002 are mounted to or otherwise attached to a yoke 1004. The teeth 1002 provide a support about which windings 1006 may be wrapped and one or more cooling channels 1008 are arranged to provide cooling to the windings 1006. Each tooth 1002 has an engagement end 1010 for engaging with the yoke 1004 and a distal end 1012. The teeth 1002 may have a tapering structure in a circumferential thickness from the distal end 1012 toward the engagement end 1010 and are formed of a magnetic material. The pair of teeth 1002 illustrated in FIG. 10 are arranged with a cooling channel 1008 arranged therebetween. On opposite sides of each tooth 1002 from the shared cooling channel 1008 are the windings 1006. In this embodiment, the distal end 1012 of the teeth 1002 includes a shaped end 1014. The shaped end 1014, in this embodiment, tapers radially inward toward the yoke 1004 and toward both the windings 1006 and the cooling channel 1008 from an inflection point 1016. The shaped end 1014 defines a reduction in material in the location of the distal end 1012 of the teeth 1002. Because the shaped end 1014 tapers outward from the inflection point 1016 toward the windings 1006 and the cooling channel 1008, the shaped end 1014 has a generally chevron or triangular shaping (opposite the embodiment of FIG. 9), with two tapered or inclined surfaces. The inflection point 1016, in some embodiments and as shown, may be a central point between opposing sides of the teeth 1002 (i.e., substantially equidistant from the windings 1006 on one side and the cooling channel 1008 on the other side).

Figure 11A:
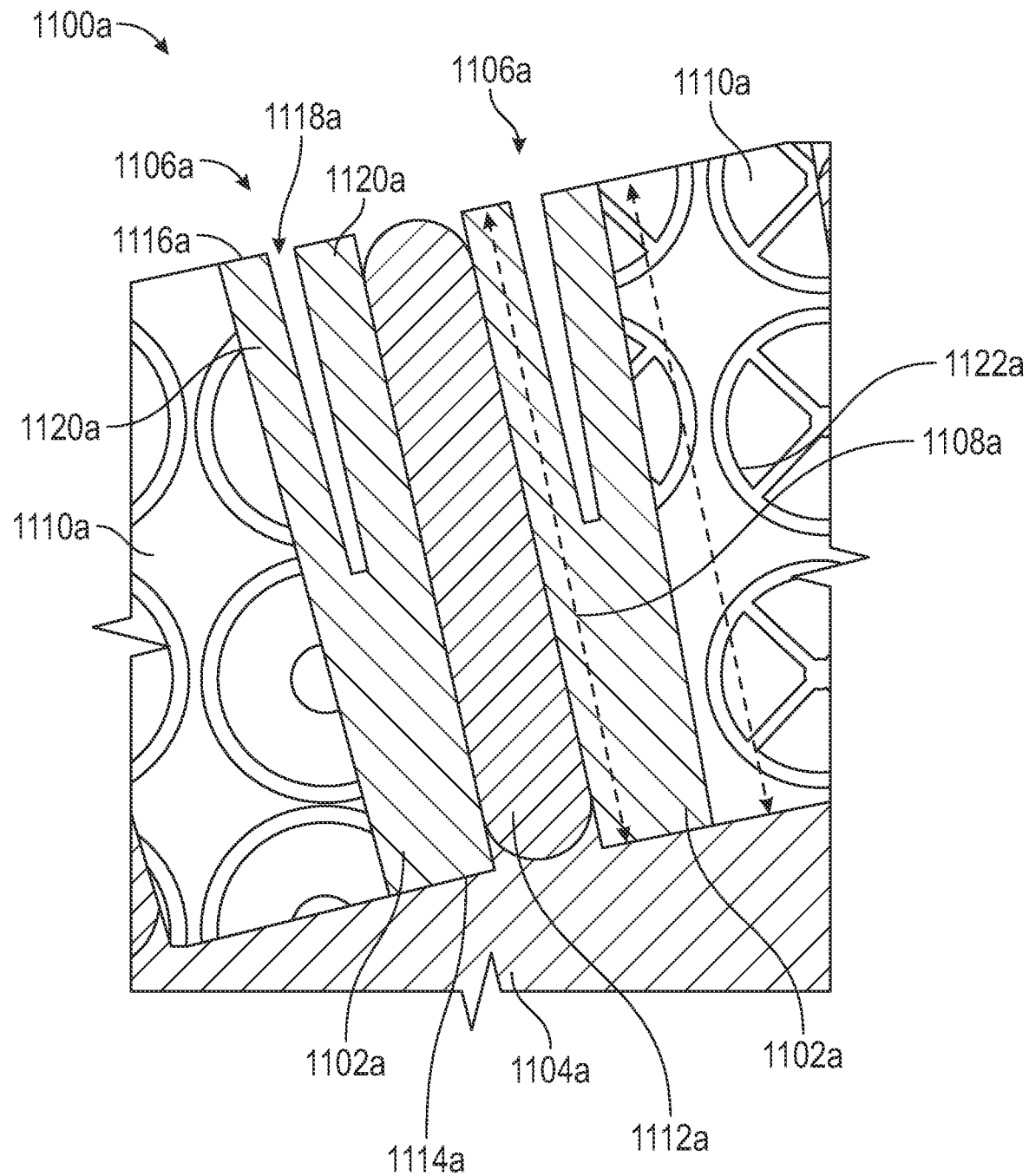
FIG. 11A is a schematic illustration of a portion of a stator of aircraft electric motor in accordance with an embodiment of the present disclosure.

Referring now to FIGS. 11A-11C, schematic illustrations of portions of stators 1100a-c, in accordance with embodiments of the present disclosure, having teeth 1102a-c are shown. The teeth 1102a-c are mounted to or otherwise attached to respective yokes 1104a-c. The stators 1100a-c are otherwise similar to that shown and described above, having windings wrapped about the teeth 1102a-c and cooling channels arranged between pairs of the teeth 1102a-c. Each of the teeth 1102a-c have respective shaped ends 1106a-c. The shaped ends 1106a-c define reductions in material of the teeth 1102a-c. In the embodiments of FIGS. 11A-11C, the shaped ends 1106a-c are defined by slots formed in the respective teeth 1102a-c, with each slot having an opening at a respective distal end of the teeth 1102a-c.

In the configuration of FIG. 11A, each tooth 1102a has a radial length 1108a equal to that of the windings 1110a and/or the cooling channel 1112a. The radial length 1108a of the teeth 1102a is defined as a total radial length (i.e., in a radial direction defined by the stator 1100a) of the tooth 1102a from an engagement end 1114a at the yoke 1104a to a distal end 1116a of the respective tooth 1102a. In this illustrative configuration, the radial length 1108a of the teeth 1102a is 100% of the radial length of the windings 1110a and/or the cooling channel 1112a. That is, the distal end 1116a of the teeth 1102a is at the same radial position as an outward most end of the windings 1110a and cooling channel 1112a. The shaped end 1106a is defined by a radial slot 1118a that extends radially inward from the distal end 1116a toward the engagement end 1114a. This radial slot 1118a results in the teeth 1102a having radial arms 1120a. As shown, the radial arms 1120a are arranged along the sides of the teeth 1102a (i.e., adjacent the windings 1110a and/or cooling channel 1112a). The radial arms 1120a extend radially outward from a base of the radial slot 1118a to the distal end 1116a. In this configuration, the radial slot 1118a and the radial arms 1120a have a radial length of about 50% the radial length of the windings 1110a and/or the cooling channel 1112a. Further, in this embodiment, the radial arms 1120a have a radial length that is about 50% the radial length 1108a of the teeth 1102a. Stated another way, the stator 1100a may have a radial span 1122a defined as a distance from the yoke 1104a to an outer edge or surface of the windings 1110a and cooling channels 1112a. In this embodiment, the teeth 1102a have a radial length 1108a that is equal to the radial span 1122a of the stator 1100a, and the radial slot 1118a extends radially inward from the distal end 1116a of the teeth 1102a approximately 50% of the radial length 1108.

Referring now to FIG. 11B, a similar set of teeth 1102b are illustrated having a radial length 1108b that is less than a radial span 1122b of the stator 1100b. The shaped ends 1106b of the teeth 1102b shown in FIG. 11B have a radial length 1108b that is about 75% the radial span 1122b of the stator 1100b. In this configuration, a slot of the shaped ends 1106b extends inward from a distal end of the respective tooth 1102b, but because the tooth 1102b is radially shorter than that shown in FIG. 11A, the radial slot and associated radial arms only extend about 40% of the distance from the distal end toward the yoke 1104b.

Referring now to FIG. 11CB, a similar set of teeth 1102c are illustrated having a radial length 1108c that is less than a radial span 1122c of the stator 1100c. The shaped ends 1106c of the teeth 1102c shown in FIG. 11C have a radial length 1108c that is about 60% the radial span 1122c of the stator 1100c. In this configuration, a slot of the shaped ends 1106c extends inward from a distal end of the respective tooth 1102c, but because the tooth 1102c is relatively radially short, the radial slot and associated radial arms only extend about 30% of the distance from the distal end toward the yoke 1104b.

In each of the embodiments of FIGS. 11A-C, a base of the slots of the shaped ends 1106a-c is set to be about 50% of the radial span 1122a-c of the respective stators 1100a-c. Because the base of the slots is at substantially the same location in each embodiment, the radial length of the radial arms and the radial slots is less from the embodiment of FIG. 11A to FIG. 11B to FIG. 11C. However, it will be appreciated that the radial position of the base of the radial slots may be varied to any position along the radial span and thus the illustrative embodiments are not intended to be limiting but rather are provided for illustrative and explanatory purposes. The length of radial arms as compared to a total length or span of the respective tooth may depend, for example, on the proportions of the cross-sectional trapezoidal shape of the tooth body. In some embodiments, when adding the notch to the outer teeth, it may be desirable to maintain the total cross sectional area along the length of the trapezoidal tooth. Adding the slot/notch into the wide end of the trapezoidal tooth allows for a reduction in tooth weight and also resultant torque ripple while maintaining adequate flux density along the entire length of the stator tooth. The width of the slot/notch may be dictated by the proportions of the wide versus narrow end-faces of the trapezoidal tooth. The depth of the slot/notch may be based, for example, on tooth proportions while respecting reasonable manufacturing limitations.

It will be appreciated that other shaped ends may be employed without departing from the scope of the present disclosure. For example, the angle of the taper of the inclined or tapering surface of the embodiments of FIGS. 7-8 may be varied, with shallower angles resulting in less empty space (e.g., lack of material of the tooth) and steeper angles resulting in more empty space. Further, the slanted or tapers surfaces of the chevron configurations (e.g., FIGS. 9-10) may have different angles of slant and/or the slanted surfaces may be of differing lengths such that the inflection point is not centered on the tooth, and thus may have a preference in one direction or the other (e.g., the inflection point is closer to the winding or the cooling channel). In embodiments having a radial slot/radial arm(s), the length (or depth) of the radial slot and/or the length of the radial arms may be varied. Further the circumferential location of the radial slot may be varied, being closer to or adjacent the cooling channel or the windings or two radial slots with a central radial arm are encompassed in embodiments of the present disclosure. Additionally, in some embodiments, the two radial arms are not required to be the same radial length and/or circumferential thickness, and the illustrative figures are not intended to be limiting to the shape and structure of the radial arms. Furthermore, although each of the embodiments of FIGS. 5-11C are described separately, those of skill in the art will appreciate that features of the various embodiments may be combined without departing from the scope of the present disclosure. For example, in some embodiments, a configuration having a shaped end with a radial slot and radial arms may include a contoured or shaped surface at the end of one or both arms (e.g., slanted surfaces, chevron surfaces, etc.). Furthermore, although shown with relatively straight or planar surfaces at the ends of the teeth, such geometry is not to be limiting. It will be appreciated that the shaped ends may include curves or curvature to form the slanted surfaces, chevron shaped (e.g., rounded ends), and/or arm/slot configurations. Furthermore, those of skill in the art will appreciate that other alternative geometries of the teeth may be used without departing from the scope of the present disclosure.

Figure 12:
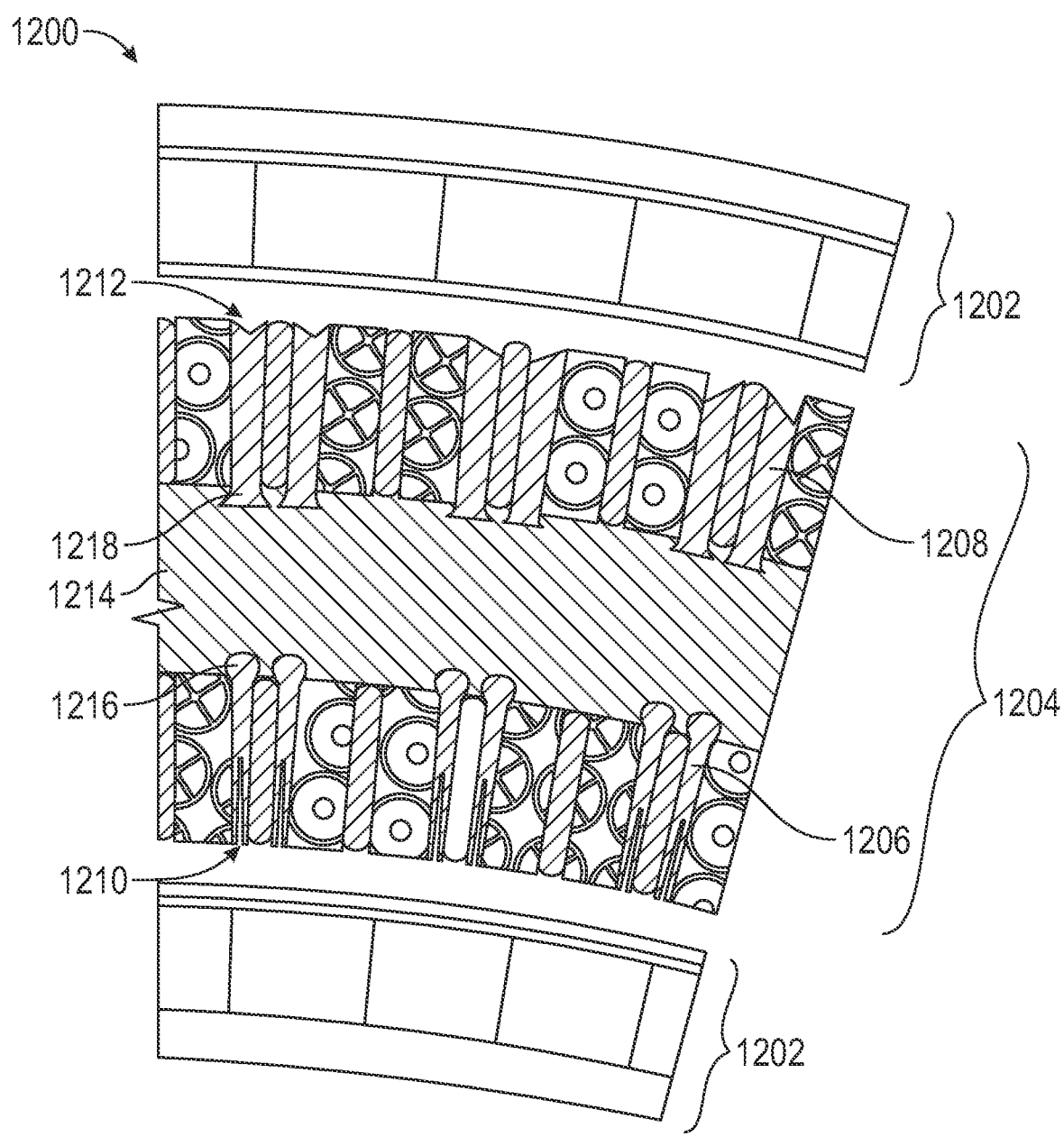
FIG. 12 is a schematic illustration of a portion of a stator and rotor of aircraft electric motor in accordance with an embodiment of the present disclosure.

Referring now to FIG. 12, a schematic illustration of portion of an aircraft electric motor 1200 in accordance with an embodiment of the present disclosure is shown. The motor 1200 includes a rotor 1202 and a stator 1204, which may be arranged similar that shown and described above. In this embodiment, both inner teeth 1206 and outer teeth 1208 include shaped ends 1210, 1212, respectively. Although shown with the inner teeth 1206 having slot/arm-type shaped ends 1210 and the outer teeth 1208 have slanted surface-type shaped ends 1212, those of skill in the art will appreciate that the inner or outer teeth 1206, 1208 can have any type of shaped end. Further, the shaped ends 1210 of the inner teeth 1206 are all similar in style and the outer teeth 1208 having a variety of shaped ends 1212, those of skill int eh art will appreciate that this is merely and example. In some embodiments, either the inner or outer teeth may have the same or different varieties of shaped ends. Moreover, in some embodiments, repeating patterns of types of shaped ends may be employed about a circumferential extend of the inner or outer teeth. Also shown in FIG. 12, the teeth 1206, 1208 are mechanically coupled to a yoke 1214 by respective mechanical couplings 1216, 1218. The mechanical couplings 1216, 1218 may be dovetail configurations, slot-and-key, or the like, as will be appreciated by those of skill in the art. Further, such mechanical couplings may be combined with other types of coupling, including brazing, welding, adhesives, fasteners, and the like.

As described herein, the teeth of the present disclosure, whether the inner or outer teeth may be formed from a magnetic material. As such, the magnetic loading of the electric motors that include such features will be increased as compared to non-magnetic teeth as conventionally used. Further, in some embodiments, to account for the increased torque ripple due to such magnetic teeth, the teeth may include shaped ends that can mitigate the increase in the torque ripple. As such, magnetic stator teeth may be used in aircraft electric motors without negatively impacting operation thereof. The magnetic teeth may be integrally formed with a metal/magnetic yoke or more may be assembled (e.g., attached) to the yoke. The attachment may be by welding, brazing, fastening, use of adhesives, use of mechanical couplings, or the like and combinations thereof.

As described above with respect to FIGS. 11A-C, the shaped ends can include a radial slot. By incorporating the radial slot, the teeth may be more pliable or increase the flexibility thereof, and thus allow for greater tolerances within the assemblies and motors into which such teeth may be incorporated. Further, as noted above, the various different illustrative geometries and shapes, and variations thereon, may be combined to form a shaped tooth of a desired size and shape that can increase magnetic loading through the use of magnetic teeth while also reducing torque ripple during operation of the motors.

In aviation-class electric motors, such as described above, a high-power density can be achieved by maximizing torque at given speeds. One way to achieve maximum torque is to increase the magnetic loading. However, by increasing magnetic loading in the stator, the motor will be subject to increased torque ripple. Advantageously, embodiments of the present disclosure allow for the use of magnetic teeth while minimizing torque ripple through the inclusion of shaped ends to such teeth.

It will be appreciated that the above described embodiments are merely for illustrative and explanatory purposes and are not intended to be limiting to the specific components and arrangements described and shown. For example, various of the embodiments can include features not explicitly shown, such as cooling systems, power systems, retention sleeves, components coupled to and driven by output shafts, and the like. Further, it will be appreciated that the specific arrangement of magnet segments, teeth, windings, cooling channels, and the like may be varied depending on the specific application, including where gaps or spaces (e.g., no magnet present along a portion of a shell) in the arrangement of magnets may be selected to achieve a desired torque or based on other considerations as will be appreciated by those of skill in the art.

Figure 13:
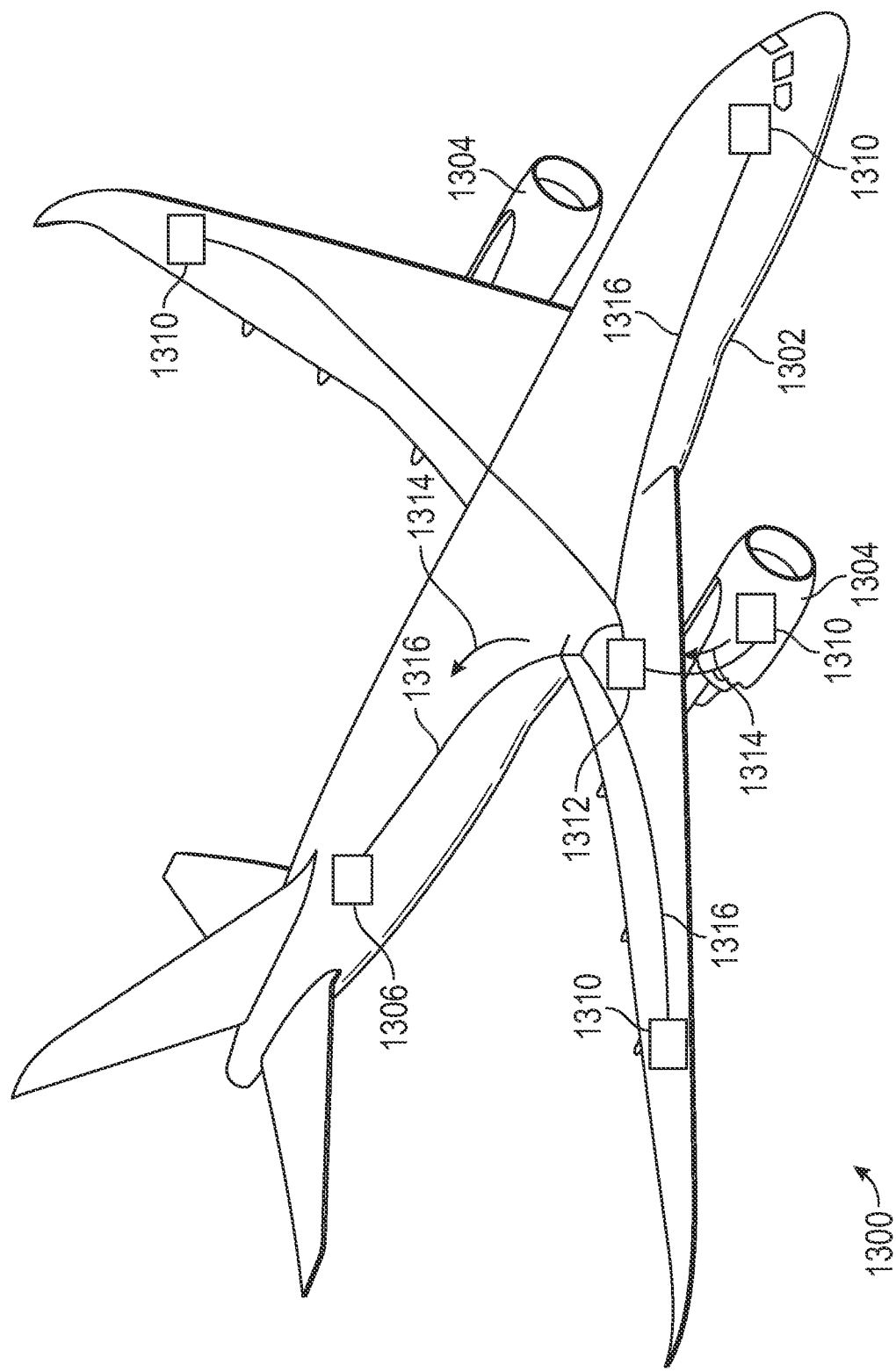
FIG. 13 is a schematic view of a power system of an aircraft that may employ embodiments of the present disclosure.

Referring now to FIG. 13, a power system 1300 of an aircraft 1302 is schematically shown. The power system 1300 includes one or more engines 1304, one or more electric motors 1306, a power bus electrically connecting the various power sources 1304, 1306, and a plurality of electrical devices 1310 that may be powered by the engines 1304 and/or motors 1306. The power system 1300 includes a power distribution system 1312 that distributes power 1314 through power lines or cables 1316. The electric motors 1306 be configured as the aircraft electric motors shown and described herein and/or incorporate features as described herein.

Advantageously, embodiments of the present disclosure provide for improved electric motors for aircraft and aviation applications. The aircraft electric motors of the present disclosure provide for improved power density electric machines by increasing magnetic loading while minimizing torque ripple. Further, with the inclusion of magnetic teeth, manufacturability may be increased. Furthermore, embodiments of the present disclosure may have a reduced weight as compared to conventional systems, provided additional benefits for aircraft applications. Additionally, by including magnetic teeth having a slot/arm configuration, the arms and separating slot may act as a spring to offer some compliance during assembly stack-up.

As described herein, embodiments of the present disclosure may provide for light-weight components. The light-weight materials, described above, can be used to form the specifically described components of the motor and/or other parts/components of the motors described herein. It will be appreciated that composite materials of the present disclosure can include, without limitation, composite with woven fabric, composite with braided fabric, composite with carbon fiber, composite with glass fiber, composite aramid fiber, composite with multiple type of fibers, composite with short fibers, and/or composite with continuous fibers. Such composite materials may be incorporated into system that also use metals which may include, without limitation, titanium, titanium alloys, aluminum, aluminum alloys, iron, stainless steel, Inconel. It will be appreciated that other metals and/or composite materials may be employed without departing from the scope of the present disclosure.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
   a rotor comprising a plurality of magnet segments arranged on a frame of the rotor, the rotor defining an internal cavity radially inward from the plurality of magnet segments;
   an output shaft operably coupled to the rotor; and
   a stator comprising a yoke and at least one winding wrapped about a plurality of stator teeth, the stator arranged within the internal cavity of the rotor, wherein the stator defines a radial span as a distance from the yoke to a radial outward edge of the at least one winding;
   wherein the plurality of stator teeth comprise at least one tooth formed from a magnetic material and having:
      an engagement end configured to engaged with the yoke;
      a distal end opposite the engagement end;
      a shaped end at the distal end of the tooth, wherein a portion of the tooth at the shaped end is closer to the yoke than the radial span; and
      one or more cooling channels arranged to provide cooling to the at least one winding,
      wherein the shaped end defines a tapering of the shaped end between the winding and a cooling channel of the one or more cooling channels.

2. The aircraft electric motor of claim 1, wherein a first tooth is arranged on a first side of the cooling channel of the one or more cooling channels and a second tooth is arranged on a second side of the same cooling channel opposite the first tooth and a winding is wrapped about a side of the first and second teeth opposite the cooling channel of the one or more cooling channels.

3. The aircraft electric motor of claim 1, wherein the tapering of the shaped end defines a tapered surface extending in a direction toward the yoke and tapering from the cooling channel of the one or more cooling channels toward the winding.

4. The aircraft electric motor of claim 1, wherein the tapering of the shaped end defines a tapered surface extending in a direction toward the yoke and tapering from the winding toward the cooling channel of the one or more cooling channels.

5. The aircraft electric motor of claim 1, wherein the tapering of the shaped end defines a tapered surface extending in a direction toward the yoke and tapering both from the cooling channel of the one or more cooling channels and the winding and tapering toward an inflection point.

6. The aircraft electric motor of claim 5, wherein the inflection point is equidistant from the winding and the cooling channel of the one or more cooling channels.

7. The aircraft electric motor of claim 1, wherein the tapering of the shaped end defines a tapered surface extending in a direction toward the yoke and tapering toward both the cooling channel of the one or more cooling channels and the winding and tapering from an inflection point.

8. The aircraft electric motor of claim 7, wherein the inflection point is equidistant from the winding and the cooling channel of the one or more cooling channels.

9. The aircraft electric motor of claim 1, wherein the at least one tooth is integrally formed with the yoke.

10. The aircraft electric motor of claim 1, wherein the at least one tooth is mechanically coupled to the yoke by a mechanical coupling.

11. The aircraft electric motor of claim 10, wherein the mechanical coupling is a dovetail configuration.

12. The aircraft electric motor of claim 1, wherein each tooth of the plurality of teeth comprises a shaped end.

13. The aircraft electric motor of claim 12, wherein the plurality of teeth comprise a pattern of different shaped ends about a circumference of the stator.

14. The aircraft electric motor of claim 1, wherein the at least one tooth is arranged as an outer tooth of the stator.

15. The aircraft electric motor of claim 1, wherein at least one cooling channel of the one or more cooling channels is embedded between two adjacent teeth of the plurality of stator teeth.

16. The aircraft electric motor of claim 1, wherein the one or more cooling channels are configured to receive a working fluid to pick up heat from the at least one winding.

17. The aircraft electric motor of claim 16, wherein the working fluid is directed to a heat exchanger to be cooled and remove the heat picked up from the at least one winding.

18. The aircraft electric motor of claim 17, wherein the heat exchanger is air cooled.

19. The aircraft electric motor of claim 1, wherein the plurality of stator teeth comprise a first plurality of stator teeth arranged to extend radially outward from an outer diameter of the yoke and a second plurality of stator arranged to extend radially inward from an inner diameter of the yoke.

20. The aircraft electric motor of claim 19, wherein the rotor comprises a first portion arranged radially outward from the first plurality of stator teeth and a second portion arranged radially inward from the second plurality of stator teeth.

* * * * *